Patented Mar. 2, 1926.

1,575,155

UNITED STATES PATENT OFFICE.

ANDREW A. DUNHAM, OF BAINBRIDGE, NEW YORK, ASSIGNOR TO THE CASEIN MANUFACTURING CO., OF NEW YORK, N. Y., A CORPORATION OF VERMONT.

CASEIN SOLIDS AND PROCESS OF MAKING THEM.

No Drawing. Application filed February 14, 1923. Serial No. 619,024.

*To all whom it may concern:*

Be it known that I, ANDREW A. DUNHAM, a citizen of the United States, and resident of Bainbridge, State of New York, have invented certain new and useful Improvements in Casein Solids and Processes of Making Them, of which the following is a specification.

At present in the manufacture of casein solids, which are used in the arts to replace the more expensive horn, celluloid and phenol condensation products, great care is required in the preparation of the raw casein used in such manufacture. Not only is it necessary to use a casein precipitated by rennet extract, but moreover the temperature of the milk treated as well as its acidity must be very closely controlled or the casein produced will not be suitable for making casein solids. The result has been that the cost of making this special casein of the required quality has been very high as compared to the usual acid-precipitated caseins, which are readily found on the market.

The present invention has for its object the manufacture of casein solids from the ordinary grades of commercial casein, such caseins being those which have been precipitated from the milk by means of such acids as hydrochloric, sulphuric, formic, acetic and the like. I have found that casein solids of good quality can be produced from the above mentioned acid caseins by the following process:

The commercial acid caseins contain a considerable amount of the free acid used to precipitate the milk, with the result that such caseins when employed in the usual way do not produce casein solids of the desired quality. They are brittle, more or less porous and of generally poor quality, because the casein particles, while fusing during the compacting process, do not lose their granular form and there are therefore open spaces between the granular particles, making impossible the production of a smooth, uniform surface. On the other hand, when all the free acid in commercial acid caseins is neutralized, the casein will not fuse or press together upon completion of heating, sufficiently to secure a satisfactory casein solid, the resulting solid showing lack of strength when it is being cut or turned by automatic machinery, and being quite apt to show cracks and check marks. A neutralized acid casein is therefore even less suitable for use in the manufacture of solids than is ordinary acid casein. According to the present invention I remove a portion of this acidity but without removing the entire acidity, with the result that the casein solids made by my process are of good quality. In order that any person skilled in the art may be enabled to carry out my process for producing these solids from acid-precipitated caseins, I will now describe in detail an example of my improved method.

100 lbs. of dry casein known in the art as "sulphuric cooked" casein is ground to a powder of about 70 mesh. A 1 gramme sample of this casein is placed in 10 cubic centimeters of cold water and allowed to stand 30 minutes, the mixture is then boiled for a short time to thoroughly extract the free acid from the casein. The acidity as represented by the water extraction is now determined by the usual chemical methods. If, for instance, the analysis shows the casein to contain 1.10% $H_2SO_4$, it would require 4.25% of borax to entirely neutralize this acidity. My process, however, requires that the casein shall be slightly acid and shall show on analysis (for instance by the method mentioned above) not more than 0.75% nor less than 0.25% of $H_2SO_4$ or a corresponding amount of any other acid used to precipitate the milk in making the casein. When I speak in my claims of 0.75% and 0.25% of free acid I refer to these proportions in terms of sulfuric acid, and to corresponding proportions of any other suitable acid; that is to say, to proportions having equivalent acidity value.

In the example assumed above, analysis shows 1.10% $H_2SO_4$ and since say 0.25% acidity in the casein is required it will be necessary to use 3.32 lbs. of borax or a corresponding amount of other acid-neutralizing chemical in order to bring the acidity to the required degree for making the solids from the 100 lbs. of casein to be used. I now proceed as follows: 300 lbs. of water are placed in a tank fitted with a steam jet, and heated to nearly or quite the boiling point and 3.32 lbs. of borax or an equivalent amount of other acid-neutralizing agent is added, such as the hydrate of aluminum, or the hydrate of zinc or other suitable hydrate or mixture thereof. With the water still at or near the boiling point, I slowly add, while agitating, the 100 lbs. of casein mentioned above and continue heating and agitating the mass for about 1/2 hour. Some of the casein may at first be dissolved by the action of the acid-neutralizing agent present, but since there is not a sufficient amount of this neutralizing agent to react with the entire amount of acid present, the small amounts of casein that are dissolved or partially dissolved will be reprecipitated as the reaction proceeds. Almost immediately after it has been added to the hot alkaline solution, the casein will begin to swell, become sticky and gradually coalesce as the reaction progresses, until a sticky mass is obtained. Usually from 1/2 to 1 hour's time is required for the heating operation, although it will be found that in some cases it is desirable to heat for a longer time, depending somewhat upon the quality of casein used.

After the partial neutralizing and heating treatment the liquid is run off from the hot sticky casein mass. The casein plastic is then while still hot placed in a suitable form or mold which is then transferred to a press and given sufficient pressure to not only assist in removing the excess water but to also make the casein more uniform, stronger and less liable to crack or break. If desired, steam heated press plates may be used. The casein mass is now left in the presses for from 6 to 24 hours, depending upon the size and thickness of the sheets being produced. The pressure is then released, the casein solid removed from the mold and may then be rendered more water-resisting by placing it in a solution of formaldehyde. After being in the formaldehyde solution from one to seven days, depending on the thickness of the sheets, the casein solid is removed, slowly dried, and then trimmed and polished.

In order to make colored casein solids I may add earth colors, pigments or dyes either to the dry casein before placing in the hot alkali solution, or I may add the coloring matter to the solution before adding the casein. A variegated color may be obtained by coloring different lots of the casein or casein mass separately and then partially mixing together to secure the mottled effect.

It is to be understood that the method of procedure given in the above example may be varied to a considerable extent. For instance, instead of treating the casein with an alkali, a hydrate or hydrates, as hereinbefore specified, I may remove the surplus acid by washing with water until the acid content is brought down to within the 0.25%–0.75% limits specified. The manner of working the sticky casein mass after the desired degree of neutralization has been secured may be varied in many ways well known to those skilled in the art of making casein solids.

Various changes in the specific form shown and described may be made within the scope of the claims without departing from the spirit of my invention.

As the essence of my invention resides in compressing an acid precipitated casein whose acidity lies between approximately 0.75% and 0.25% of free acid, it would obviously constitute a mere equivalent of my invention to neutralize the casein and then to bring up the acidity by adding the necessary proportion.

I claim:—

1. The step in the process of making casein solids which consists in treating acid precipitated casein, the acidity of which is materially above 0.75% of free acid, with a sufficient amount of acid neutralizing substances to reduce its acidity to a point between the limits of approximately 0.75% and 0.25% of free acid.

2. The herein described new casein solid produced from acid precipitated casein and having an acidity between the limits of approximately 0.75% and 0.25% of free acid.

In testimony whereof I have hereunto set my hand.

ANDREW A. DUNHAM.